United States Patent
Dassen et al.

(10) Patent No.: US 9,981,534 B2
(45) Date of Patent: May 29, 2018

(54) CLOSED SECTION GEOMETRY, HOLLOW SHAPE, VEHICLE COMPONENTS

(71) Applicant: SABIC Global Technologies B.V., Bergen op Zoom (NL)

(72) Inventors: Tim Willem Joseph Leonard Dassen, Schinnen (NL); Davy Wilhelmus Anna Brands, Maastricht (NL); Claire Marie-Annick Martin, Maaseik (BE); Angel Stoyanov Yanev, Maastricht (NL); Geert Jan Schellekens, Gilze (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 50 days.

(21) Appl. No.: 15/027,799

(22) PCT Filed: Oct. 7, 2014

(86) PCT No.: PCT/IB2014/065127
§ 371 (c)(1),
(2) Date: Apr. 7, 2016

(87) PCT Pub. No.: WO2015/052655
PCT Pub. Date: Apr. 16, 2015

(65) Prior Publication Data
US 2016/0229271 A1 Aug. 11, 2016

Related U.S. Application Data

(60) Provisional application No. 61/935,718, filed on Feb. 4, 2014, provisional application No. 61/887,687, filed on Oct. 7, 2013.

(51) Int. Cl.
*B60J 5/10* (2006.01)
*B62D 29/04* (2006.01)
(Continued)

(52) U.S. Cl.
CPC ............... *B60J 5/107* (2013.01); *B60J 5/10* (2013.01); *B62D 27/023* (2013.01);
(Continued)

(58) Field of Classification Search
CPC ........... B60J 5/107; B60J 5/10; B62D 29/005; B62D 25/12
(Continued)

(56) References Cited

U.S. PATENT DOCUMENTS 4,083,903 A   4/1978  Gilbert et al.
4,822,098 A * 4/1989  Vogt .................... B60J 5/101
                                           296/146.5
(Continued)

FOREIGN PATENT DOCUMENTS

CA    2762401 A1    6/2012
CN    102458890 B    5/2012
(Continued)

OTHER PUBLICATIONS

English Abstract of JP1129052; Date of Publication: May 22, 1989; 1 Page.
(Continued)

*Primary Examiner* — Pinel E Romain
(74) *Attorney, Agent, or Firm* — Cantor Colburn LLP

(57) ABSTRACT

In an embodiment, a vehicle component for a vehicle can comprise: a carrier comprising a top portion, a bottom portion, a first side portion, and a second side portion; a cavity, wherein the cavity comprises a bottom cavity wall, cavity side walls, and a top portion of the cavity having an upper cavity wall; an insert covering at least a portion of the cavity and attached to the upper cavity wall, the bottom cavity wall, and/or the cavity side walls; and a cover attached to the carrier.

19 Claims, 12 Drawing Sheets

(51) Int. Cl.
  *B62D 27/02* (2006.01)
  *B62D 25/08* (2006.01)
  *B62D 33/06* (2006.01)
(52) U.S. Cl.
  CPC .......... *B62D 29/043* (2013.01); *B62D 25/085* (2013.01); *B62D 33/06* (2013.01)
(58) Field of Classification Search
  USPC ...................................................... 296/146.6
  See application file for complete search history.

(56) References Cited

U.S. PATENT DOCUMENTS

| | | | |
|---|---|---|---|
| 4,965,028 A | 10/1990 | Maus et al. | |
| 5,799,991 A | 9/1998 | Glance | |
| 6,099,949 A | 10/2000 | Nomura et al. | |
| 6,157,416 A | 12/2000 | Whitelaw et al. | |
| 6,683,174 B1 | 1/2004 | Ozaki et al. | |
| 6,747,086 B2 | 6/2004 | Guebitz | |
| 6,854,785 B2* | 2/2005 | Simon | B60J 5/0416 296/146.7 |
| 7,270,863 B2 | 9/2007 | Harima et al. | |
| 7,399,022 B2 | 7/2008 | Kalmbach et al. | |
| 7,537,267 B2* | 5/2009 | Tanaka | B60J 5/0429 296/146.6 |
| 8,403,399 B2* | 3/2013 | Kuntze | B60J 5/107 296/146.6 |
| 8,419,108 B2 | 4/2013 | Leterrier et al. | |
| 8,550,536 B2 | 10/2013 | Gachter et al. | |
| 8,567,841 B2* | 10/2013 | Ginestet | B60J 5/107 296/146.8 |
| 8,622,458 B2 | 1/2014 | Hache | |
| 8,727,422 B2 | 5/2014 | Iwabuchi et al. | |
| 8,894,128 B2* | 11/2014 | Barral | B60J 5/107 296/146.6 |
| 9,162,555 B2* | 10/2015 | Kodama | B60J 5/10 |
| 2002/0065357 A1 | 5/2002 | Guebitz | |
| 2003/0110705 A1* | 6/2003 | Hlavach | B60J 5/103 49/501 |
| 2008/0011188 A1* | 1/2008 | Campus | B61D 17/045 105/401 |
| 2011/0061302 A1 | 3/2011 | Barral et al. | |
| 2012/0153670 A1 | 6/2012 | Crane et al. | |
| 2012/0248814 A1 | 10/2012 | Tsukiyama et al. | |
| 2012/0280533 A1 | 11/2012 | Gachter et al. | |
| 2013/0280452 A1 | 10/2013 | Nawroth et al. | |
| 2013/0328351 A1 | 12/2013 | Gonin | |
| 2014/0110964 A1 | 4/2014 | Schijve et al. | |
| 2014/0146694 A1 | 5/2014 | Poletti et al. | |
| 2016/0152121 A1* | 6/2016 | Ikeda | B60J 5/101 49/501 |
| 2016/0167494 A1* | 6/2016 | Ayukawa | B60J 5/107 49/502 |

FOREIGN PATENT DOCUMENTS

| | | |
|---|---|---|
| CN | 103772921 A | 5/2014 |
| CN | 203655050 U | 6/2014 |
| CN | 203713981 U | 7/2014 |
| EP | 1120303 A1 | 8/2001 |
| EP | 1787841 A1 | 5/2007 |
| EP | 2496428 B1 | 9/2012 |
| FR | 2961151 B1 | 12/2011 |
| FR | 2968631 A1 | 6/2012 |
| JP | 3172039 A | 4/1986 |
| JP | 1129052 A | 5/1989 |
| JP | 7112457 A | 5/1995 |
| JP | 9314614 A | 12/1997 |
| JP | 9316416 | 12/1997 |
| JP | 10329165 A | 12/1998 |
| JP | 11228759 A | 8/1999 |
| JP | 11333883 A | 12/1999 |
| JP | 2000239437 A | 9/2000 |
| JP | 2001018654 A | 1/2001 |
| JP | 2001277851 A | 10/2001 |
| JP | 2005104376 A | 4/2005 |
| JP | 2010188792 | 9/2010 |
| JP | 2010247676 A | 11/2010 |
| JP | 2010260519 A | 11/2010 |
| JP | 2011051544 A | 3/2011 |
| JP | 2011057188 A | 3/2011 |
| JP | 2011121479 A | 6/2011 |
| JP | 2011126388 A | 6/2011 |
| JP | 2011136606 A | 7/2011 |
| JP | 2011219000 A | 11/2011 |
| JP | 2012030654 A | 2/2012 |
| JP | 2012046109 A | 3/2012 |
| JP | 2012061957 A | 3/2012 |
| JP | 2012131375 A | 7/2012 |
| JP | 2012206612 A | 10/2012 |
| JP | 2012206614 A | 10/2012 |
| JP | 2013006570 A | 1/2013 |
| JP | 2013056669 A | 3/2013 |
| JP | 2013124006 A | 6/2013 |
| JP | 2013230716 A | 11/2013 |
| JP | 2013230717 A | 11/2013 |
| JP | 2013230723 A | 11/2013 |
| JP | 2014076707 A | 5/2014 |
| JP | 2014101055 A | 6/2014 |
| JP | 2014104790 A | 6/2014 |
| JP | 2014159243 A | 9/2014 |
| KR | 1020120045642 A | 5/2012 |
| WO | 2006053547 A2 | 5/2006 |
| WO | 2007009587 A1 | 1/2007 |
| WO | 2012080621 A1 | 6/2012 |

OTHER PUBLICATIONS

English Abstract of JP2001018654(A); Date of Publication: Jan. 23, 2001; 2 Pages.
English Abstract of JP2001277851(A); Date of Publication: Oct. 10, 2001; 2 Pages.
English Abstract of JP2010260519(A); Date of Publication: Nov. 18, 2010; 2 Pages.
English Abstract of JP2011051544(A); Date of Publication: Mar. 17, 2011; 2 Pages.
English Abstract of JP2011057188(A); Date of Publication: Mar. 24, 2011; 2 Pages.
English Abstract of JP2011121479(A); Date of Publication: Jun. 23, 2011; 2 Pages.
English Abstract of JP2011126388(A); Date of Publication: Jun. 30, 2011; 1 Page.
English Abstract of JP2011136606(A); Date of Publication: Jul. 14, 2011; 2 Pages.
English Abstract of JP2011219000(A); Date of Publication: Nov. 4, 2011; 2 Pages.
English Abstract of JP2012030654(A); Date of Publication: Feb. 16, 2012, 1 Page.
English Abstract of JP2012046109(A); Date of Publication: Mar. 8, 2012; 1 Page.
English Abstract of JP2012061957(A); Date of Publication: Mar. 29, 2012; 1 Page.
English Abstract of JP2012206612(A); Date of Publication: Oct. 25, 2012; 1 Page.
English Abstract of JP2012206614(A); Date of Publication: Oct. 25, 2012; 1 Page.
English Abstract of JP2013006570(A); Date of Publication: Jan. 10, 2013; 1 Page.
English Abstract of JP2013056669(A); Date of Publication: Mar. 28, 2013; 1 Page.
English Abstract of JP2014159243(A); Date of Publication: Sep. 4, 2014; 1 Page.
English Abstract of JP61072039; Date of Publication: Apr. 14, 1986; 1 Page.
English Abstract of JP7112457; Date of Publication: May 2, 1995; 2 Pages.
English Abstract of KR1020120045642(A); Date of Publication: May 9, 2012; 1 Page.

(56) References Cited

OTHER PUBLICATIONS

International Search Report for International Application No. PCT/IB2014/065127; International Filing Date: Oct. 7, 2014; dated Jan. 23, 2015; 4 Pages.
Machine Translation of CN102458890(B); Date of Publication: May 16, 2012; 23 Pages.
Machine Translation of CN103772921(A); Date of Publication: May 7, 2014; 11 Pages.
Machine Translation of CN203655050(U); Date of Publication: Jun. 18, 2014; 5 Pages.
Machine Translation of CN203713981(U); Date of Publication: Jul. 16, 2014; 14 Pages.
Machine Translation of EP1120303; Date of Publication: Aug. 1, 2001; 14 Pages.
Machine Translation of EP2496428(B1); Date of Publication: Sep. 12, 2012; 24 Pages.
Machine Translation of FR2961151(B1); Date of Publication: Dec. 16, 2011; 10 Pages.
Machine Translation of FR2968631; Date of Publication: Jun. 15, 2012; 9 Pages.
Machine Translation of JP09314614 (A); Date of Publication: Dec. 9, 1997; 12 Pages.
Machine Translation of JP11228759; Date of Publication: Aug. 24, 1999; 11 Pages.
Machine Translation of JP11333883(A); Date of Publication: Dec. 7, 1999; 5 Pages.
Machine Translation of JP2000239437; Date of Publication: Sep. 5, 2000; 30 Pages.
Machine Translation of JP2005104376(A); Date of Publication: Apr. 21, 2005; 15 Pages.
Machine Translation of JP2010188792; Date of Publication: Sep. 2, 2010; 10 Pages.
Machine Translation of JP2010247676 (A); Date of Publication: Nov. 4, 2010; 13 Pages.
Machine Translation of JP2012131375(A); Date of Publication: Jul. 12, 2012; 22 Pages.
Machine Translation of JP2013124006(A); Date of Publication: Jun. 24, 2013; 29 Pages.
Machine Translation of JP2013230716(A); Date of Publication: Nov. 14, 2013; 14 Pages.
Machine Translation of JP2013230717(A); Date of Publication: Nov. 14, 2013; 16 Pages.
Machine Translation of JP2013230723(A); Date of Publication: Nov. 14, 2013; 27 Pages.
Machine Translation of JP2014076707(A); Date of Publication: May 1, 2014; 28 Pages.
Machine Translation of JP2014101055(A); Date of Publication: Jun. 5, 2014; 16 Pages.
Machine Translation of JP2014104790(A); Date of Publication: Jun. 9, 2014; 19 Pages.
Machine Translation of JPH09316416(A); Date of Publication: Dec. 9, 1997; 29 Pages.
Machine Translation of JPH10329165(A); Date of Publication: Dec. 15, 1998; 14 Pages.
Machine Translation of WO2006053547; Date of Publication: May 26, 2006; 39 Pages.
Machine Translation of WO2012080621; Date of Publication: Jun. 21, 2012; 17 Pages.
Written Opinion of the International Searching Authority for International Application No. PCT/IB2014/065127; International Filing Date: Oct. 7, 2014; dated Jan. 23, 2015; 3 Pages.

* cited by examiner

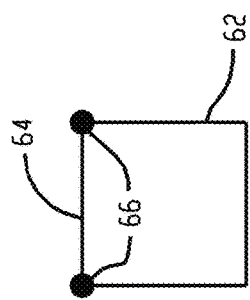
Fig. 8B
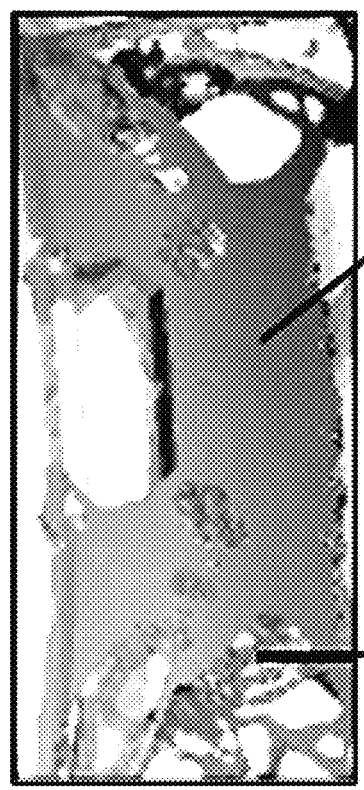
Fig. 8A
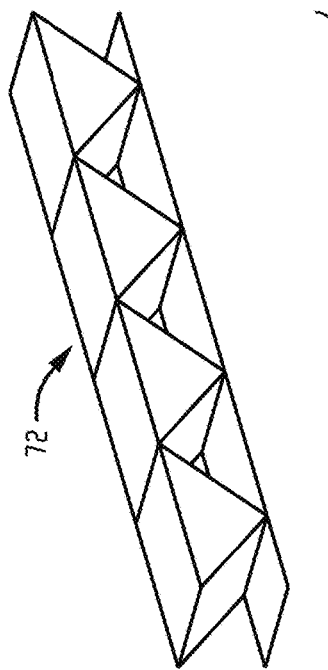
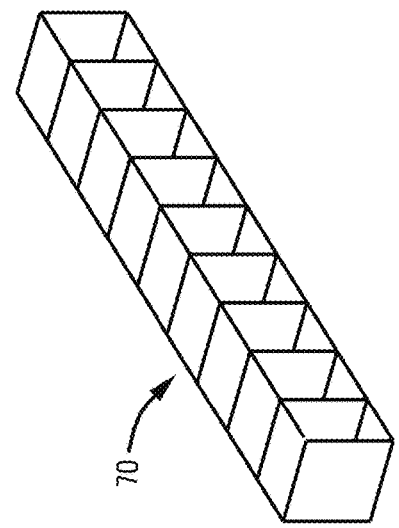
Fig. 9

CLOSED SECTION GEOMETRY, HOLLOW SHAPE, VEHICLE COMPONENTS

CROSS REFERENCE TO RELATED APPLICATIONS

This application is a National Stage Application of PCT/IB2014/065127, filed Oct. 7, 2014, which claims the benefit of U.S. Provisional Application Nos. 61/935,718, filed Feb. 4, 2014 and 61/887,687, filed Oct. 7, 2013, all of which are incorporated by reference in their entirety herein.

BACKGROUND

This disclosure relates to a structural component of a vehicle such as a lift gate, and in particular, a polymeric vehicle component.

Structural components for vehicles, such as front end modules and lift gates, can be loaded with torsion due to forces acting at separate locations. To accommodate this, high bending stiffness is desirable. For some applications, techniques such as injection molding and/or injection compression molding, such as with a given drawn direction and sliders, cannot provide desired and/or sufficient torsion stiffness.

Lift gates are provided to open or close an opening formed in a vehicle (e.g., at a rear portion of a hatch back type of passenger vehicle or the like). Front end modules are provided to allow access to components in the front of a vehicle, such as a truck. For example, components including cooling systems and oil and wiper fluids, and possibly other components (e.g., engine, radiator, heating, ventilation, and air conditioning systems) might be accessed through a front end module of a truck or bus. Because the weight of a vehicle body has an impact on the fuel consumption of the vehicle, attempts have been made to produce lift gates and front end modules from lighter-weight materials, such as polymeric materials, in an effort to reduce the overall weight of the vehicle. The use of polymeric materials reduces the overall weight, but in some applications may not accommodate stresses and strains placed on the lift gate or front end module. As an example, the lift gate or front end module may bend undesirably. This can displease a consumer. Worse yet, such flexure may fail to sufficiently resist deformation in a crash.

Lift gates and front end modules are large component members of a vehicle body that rotate around a hinge when they open or close. Due to the level of stress from the repeated opening and closing of the components and the size of the components, they comprise a lot of metal (for structural integrity) and have ribs or steel inserts to ensure proper operation and structural stability. Other attempts to increase the stiffness and torsional rigidity include increasing the thickness of the panels. However, an increase of the panel thickness and/or the addition of the ribs for increasing the rigidity of the component also increases the overall weight of the component, which can negatively affect the fuel efficiency of the vehicle. Furthermore, the use of reinforcements, such as ribs, can affect the ability to efficiently run wires, cables, or the like through the component. In addition, ribs and other reinforcements negatively impact the aesthetic quality of the component because such features can leave visible imperfections on the panels, thus requiring an additional panel to be installed to provide a finished appearance. The use of steel or other materials in combination with a plastic component can also add manufacturing time and expense to the production of the vehicle component.

Accordingly, a need exists for a light-weight vehicle component with high torsional and bending stiffness without diminishing the functional and/or aesthetic quality of the component.

SUMMARY

Disclosed herein are vehicle components, such as lift gates and front end modules, and vehicles comprising the same.

In an embodiment, a vehicle component for a vehicle can comprise: a carrier comprising a top portion, a bottom portion, a first side portion, and a second side portion; a cavity, wherein the cavity comprises a bottom cavity wall, cavity side walls, and a top portion of the cavity having an upper cavity wall; an insert covering at least a portion of the cavity and attached to the upper cavity wall, the bottom cavity wall, and/or the cavity side walls; and a cover attached to the carrier.

The above described and other features are exemplified by the following figures and detailed description.

BRIEF DESCRIPTION OF THE DRAWINGS

Refer now to the figures, which are exemplary embodiments, and wherein the like elements are numbered alike.

FIG. 8A is a rear view of the bottom portion of the lift gate of FIG. 4.

FIG. 8B is an illustration of the essentially box type shape formed by the closed hollow profile.

FIG. 9 is a side-by-side comparison of a closed hollow profile and a cross ribbed C-profile.

DETAILED DESCRIPTION

Disclosed herein is a structural component of a vehicle such as a lift gate, a front end module, a door, and other structural components that have bending and torsional stiffness needs, in particular, a polymeric vehicle component comprising portions and/or inserts with a closed hollow profile to improve bending and torsional stiffness. Without being bound by theory, it is believed that the favorable results obtained herein, e.g., a light-weight vehicle component with optimal bending and torsion stiffness and increased torsion per mass, can be achieved using a closed hollow shape profile integrated into a portion of the vehicle component.

The term "vehicle component" as used herein can refer to a lift gate, door module, front end module, and other components such as, but not limited to instrument panel carriers, and bumper claddings of a vehicle structure. As illustrated in the figures and discussed below, a lift gate will be used as an exemplary vehicle component for FIGS. 1-8, and a front end module will be used as an exemplary vehicle component for FIGS. 11-16. However, the embodiments discussed below can be applied to other vehicle components as mentioned above.

A lift gate is a rear portion of a vehicle designed to open the rear of the vehicle, e.g. a hatchback. A front end module is a portion of a front of a vehicle, such as a truck, bus, or the like, that is designed to open to allow access to internal components of the truck. For example, a front end module can provide access to vehicle systems, e.g., cooling systems, oil, wiper fluid, etc. Due to their relative size, lift gates and front end modules can be subjected to high levels of torsion and bending. However, efforts to increase the torsion and bending stiffness, such as the use of steel panels, ribs, and/or additional materials, have yielded additional problems including added weight, production costs, and aesthetic issues. It was found that using a closed hollow profile in specific areas of a vehicle component (e.g., polymeric lift gate and a polymeric front end module) provided superior torsion and bending stiffness without the aforementioned deficiencies.

Figure 1:
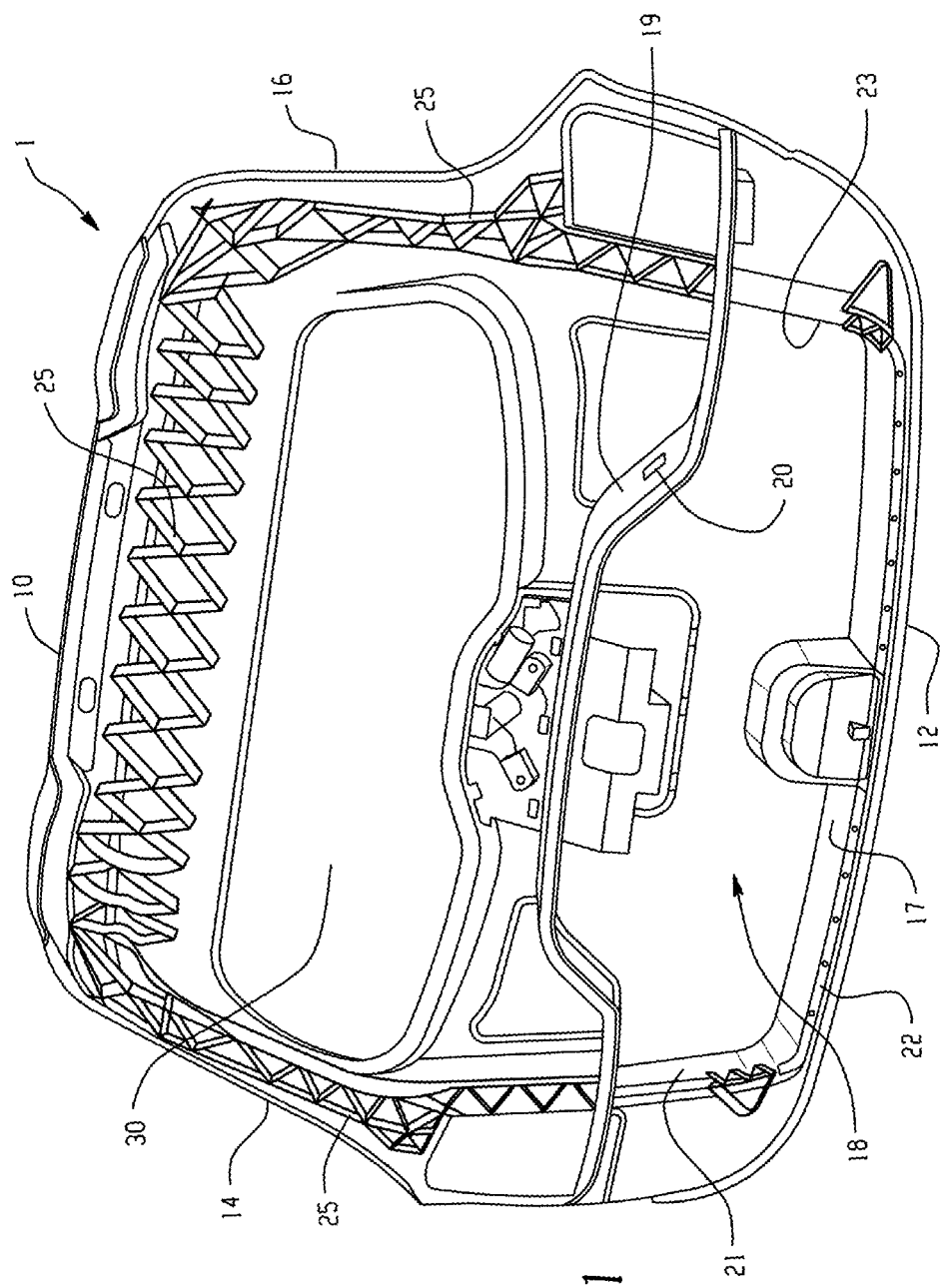
FIG. 1 is a rear view of the inner portion of a lift gate.

FIG. 1 is a rear view of an inner portion of lift gate 1. As illustrated in FIG. 1, lift gate 1 comprises carrier formed from a top portion 10, bottom portion 12, first side portion 14, and second side portion 16. Lift gate 1 can include window opening 30 located below top portion 10 and above bottom portion 12. Top portion 10, first side portion 14, and second side portion 14 can include ribs 25. Bottom portion 12 can include cavity 18.

Cavity 18 can extend horizontally from first side portion 14 to second side portion 16 and can be bound by first cavity side wall 21 and second cavity side wall 23. Cavity 18 can also extend vertically from a bottom edge of bottom portion 12 to a point below window opening 30. The specific size of the cavity will depend upon the particular vehicle design. Cavity 18 is defined in a vertical direction by upper cavity wall 19 and lower cavity wall 17. As shown in FIG. 1, upper cavity wall 19 can include a plurality of openings to accommodate a connection mechanism, discussed in further detail below. In addition, upper cavity wall 19 can have an opening 20 to receive the attachment from the insert 24. Lower cavity wall 17 can include an area 22, which serves to compress the water seal which is usually mounted to the body in white (BIW).

Figure 2:
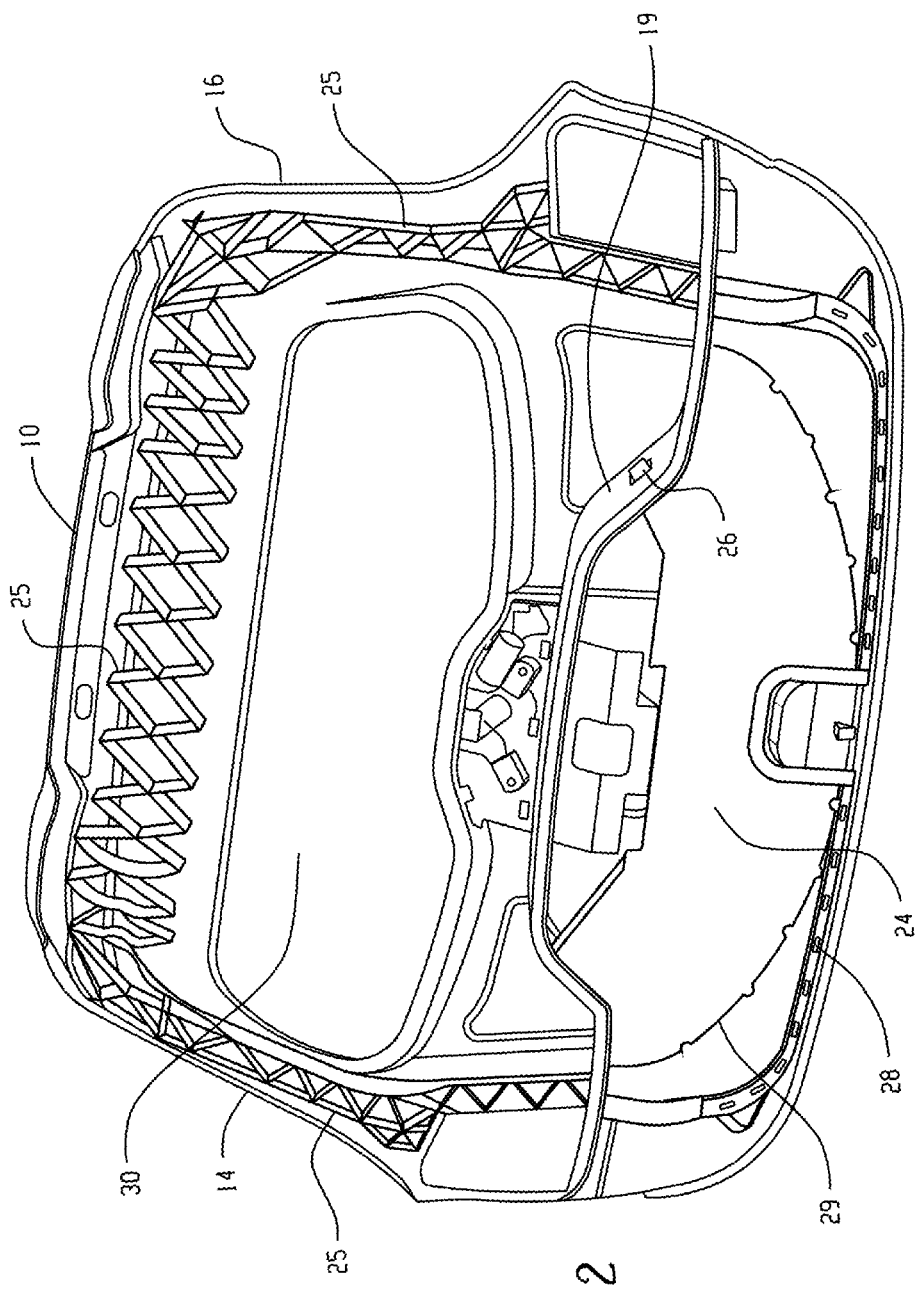
FIG. 2 is a rear view of the inner portion of the lift gate of FIG. 1 with a closed hollow profile insert.

As shown in FIG. 2, insert 24 is shaped to substantially fill cavity 18 so as to provide an interference fit with the cavity walls. For example, insert 24 can abut upper cavity wall 19 and lower cavity wall 17, thereby preventing movement of insert 24 in a vertical direction. In addition, insert 24 can abut first cavity side wall 21 and second cavity side wall 23. During attachment, insert 24 can be placed within cavity 18 by forcing the top surface of insert 24 beyond lip 20 by temporarily deforming lip 20 such that lip 20 returns to its original shape and position after insert 24 is in place. Thus, lip 20 can help retain insert 24 in a proper location.

Insert 24 can be attached to lift gate 1 by removable (i.e., without damage to the vehicle component) or permanent attachment (i.e., not removable). For example, upper cavity wall can include plurality of openings sized to receive a plurality of first attachment mechanisms 26 located on or attached to the top surface of insert 24 in the form of a clip, bolt, snap-fit connection, or similar removable attachment. Using clips and/or other removable elements can simplify tooling and/or enable ease of assembly. For the removable elements it is desirable that they prevent relative motion between the insert and the cavity in-plane of the insert as to get maximum torsion stiffening. Therefore, the openings and the clips can be designed for a snug fit (e.g., where the clip has a size that is only smaller than the opening inner diameter to enable insertion). In other words, the clips can have a size that enables transfer of loads to the insert (e.g., axially, e.g., from the sides of the clip). It is further noted, that the openings are illustrated along an upper cavity wall, but are not limited to such location. Openings can be located all around the cavity or in portions of the cavity. The specific location is dependent upon design restrictions and not mandatory that clips should be at the top and that the permanent fixations (e.g., heat stakes) should be at the bottom. Hence, the fixations can be any combination of permanent and removable (wherein removable means without damage to the vehicle component), depending upon the desired design criteria and forming (e.g., molding) constraints. In addition, the bottom of insert 24 can be attached to the lower cavity wall 17 and/or recess 22 through a second attachment mechanism 28, such as heat staking or other permanent attachment features as well as any removable fixation elements mentioned above. Heat staking is the process of melting and reforming a thermoplastic stud to lock elements together mechanically.

As is seen in FIGS. 1 and 2, the cavity 18 can be located in the lower portion 12 of the lift gate. Optionally, the cavity 18 does not extend to the edge of the lower portion, it occupies less than all of the lower portion. For example, the cavity can be located over greater than or equal to 50% of the lower portion, for example, over 60% to 90% of the lower portion. In other words, the upper cavity wall 19 can form the top of the lower portion 12, the lower cavity wall 17 can form the bottom of the lower portion 12, such that the cavity extends from the top to the bottom of the lower portion 12. However, the first cavity side wall 21 and/or the second cavity side wall 23 form the two sides of the lower portion. In other words, the cavity 18 does not extend from one side of the lower portion to the other side of the lower portion. Hence, the lower portion can have an area that extends beyond at least one side of the cavity 18, for example, that extends beyond at least two walls of the cavity 18, such that when the insert 24 is located over the cavity 18, the insert does not extend to the periphery or a lip of the lower portion 12 on all sides. The insert can be spaced apart from the periphery (or lip) of the lower portion 12 on a side, for example, on two opposite sides.

As is further illustrated in FIGS. 1 and 2, the lower portion can comprise the cavity 18 and insert 24, while the upper portion can comprise ribs 25. The ribs 25 can optionally be triangular and can be overlapping, as desired. Optionally, the cavity is free of ribs. Optionally, the bottom portion is free of ribs. In other words, the portion of the lift gate that is below the lights and below the window, can be free of ribs, while above the lights and above and around the window can be ribbing.

Insert 24 can be made from a polymeric material and have a closed hollow profile (e.g., a sort of box shape) as illustrated in FIGS. 8A and 8B. As can be seen from FIG. 8B, the cavity 62 forms a "box", wherein the insert 64 ("lid") closes the box and the fixation points 66 attach the lid to the box. Accordingly, insert 24 provides increased torsion stiffness and bending stiffness compared to ribs while also providing a lower weight than metallic or steel plates.

Figure 3:
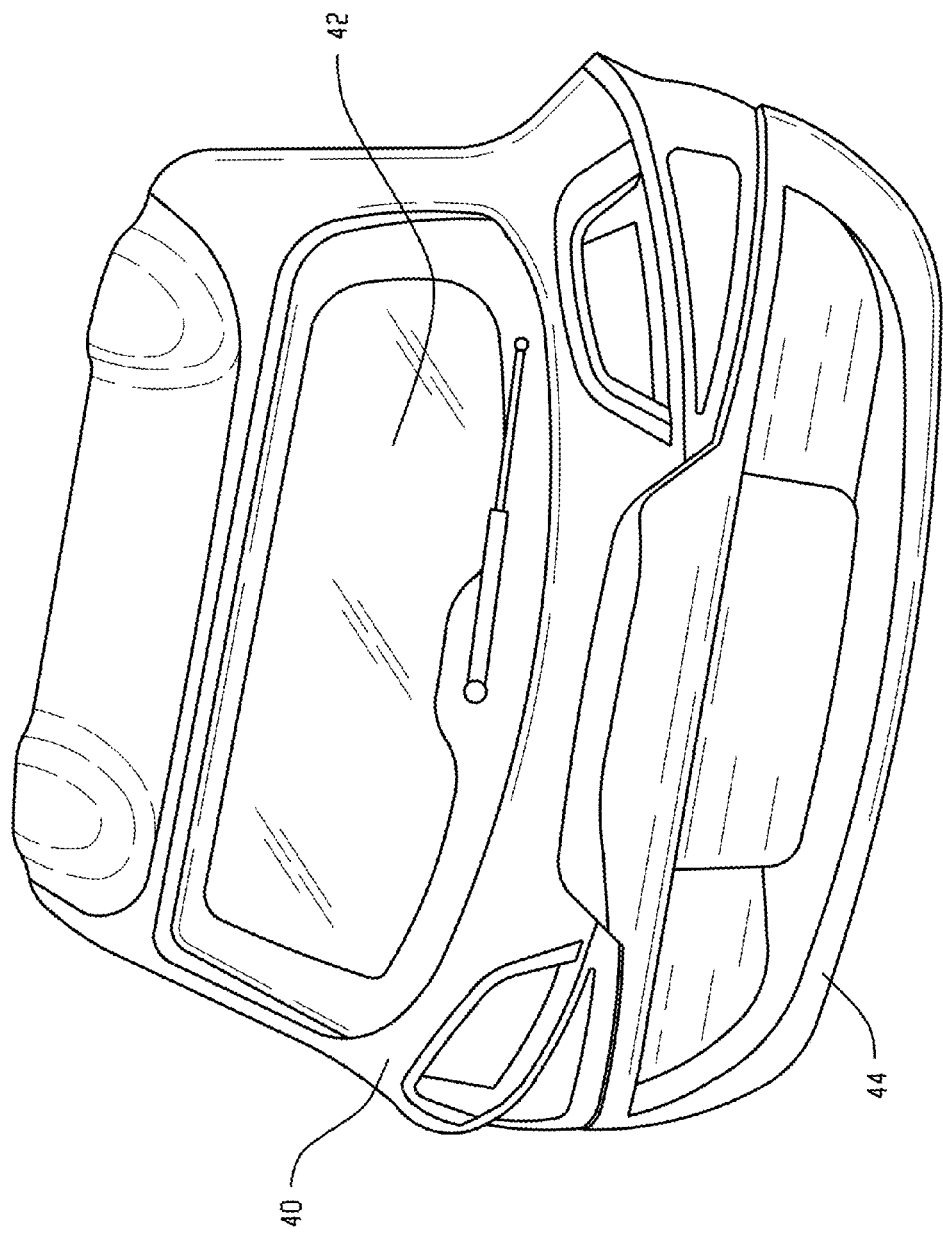
FIG. 3 is a rear view of the lift gate of FIGS. 1 and 2 with an outer cover.

As shown in FIG. 3, insert cover 44 can be positioned over the insert for aesthetic purposes. Since the insert 24 provides the structural integrity to the lift gate, the insert cover 44 can be attached to compensate for thermal expansion and contraction issues. In other words, the insert cover 44 can be a non-load bearing element (i.e., it bears its own load (weight), and does not provide further load bearing capabilities to the lift gate). In contrast, the insert 24 is a load bearing element which adds stiffness and structural integrity to the lift gate.

Furthermore, outer cover 40 can be positioned over at least a portion of the lift gate. Outer cover 40 can be attached through adhesive or other suitable attachments. Outer cover 40 can be a single piece, or comprise multiple pieces. In addition, outer cover 40 can comprise a polymeric material. For example, outer cover 40 can comprise the same material as lift gate 1 and/or insert 24, or a different polymeric material. In addition, when outer cover 40 comprises multiple pieces, the various pieces can comprise the same material. In the alternative, when outer cover 40 comprises multiple pieces, the various pieces can comprise different materials. Outer cover 40 can also include window 42. Window 42 can comprise glass of a polymeric material such as polycarbonate that can further reduce the overall weight of the lift gate structure. For example, window 42 can comprise a plastic glazing, commercially available through Exatec™, LLC.

Figure 4:
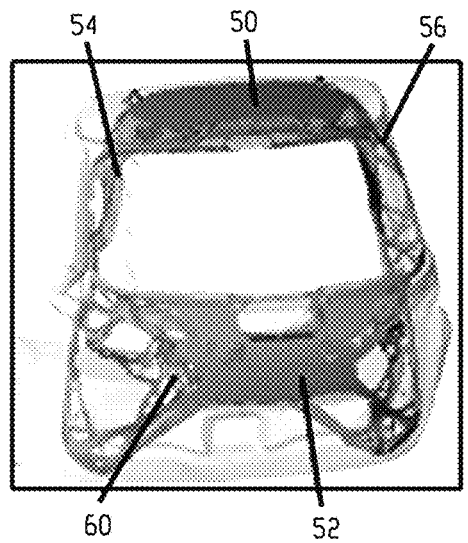
FIG. 4 is a rear view of a lift gate.
Figure 5:
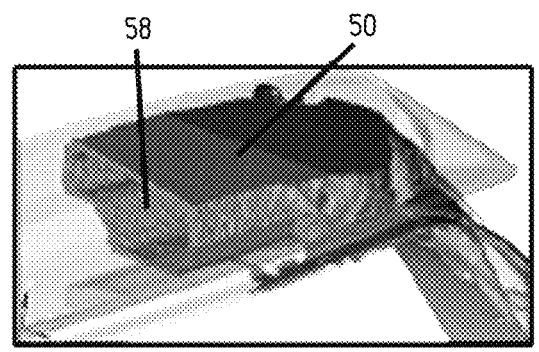
FIG. 5 is a cross sectional view of the top portion of the lift gate of FIG. 4 taken along line A-A.
Figure 6:
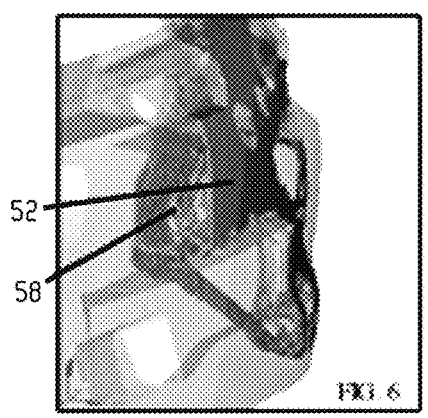
FIG. 6 is a cross sectional view of the bottom portion of the lift gate of FIG. 4 taken along line A-A.
Figure 7:
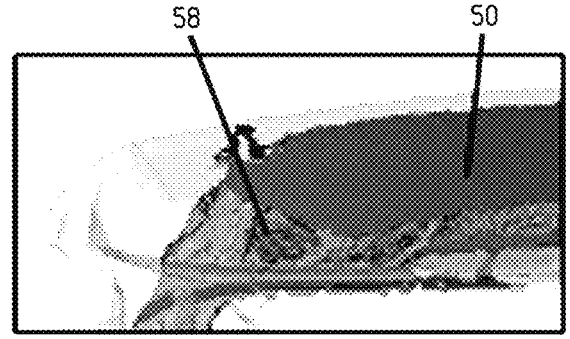
FIG. 7 is a rear view of the top portion of the lift gate of FIG. 4.

FIGS. 4-8 illustrate a lift gate with a unitary body structure 45. As shown in FIG. 4, body structure 45 includes top portion 50, bottom portion 52, first side portion 54, and second side portion 56. Optionally, first side portion 52 and second side portion 54 can comprise a structural enhancement, such as ribs or webbing. As illustrated in FIGS. 5 and 6, top portion 50 and bottom portion 52 comprise a closed hollow profile 58. In addition, as shown in FIGS. 7 and 8, at least one side of top portion 50 and bottom portion 52 comprises an opening 60 or a plurality of openings 60, which provides accessibility for the entrance of media such as gas and fluids or cores and sliders. Accordingly, the closed hollow profiles can be manufactured through a variety of production techniques such as gas or water assisted injecting molding, collapsible cores, sliders, or over molded hollow steel inserts. Body structure 45 can be included in a lift gate between an inner and outer cover layer through the use of adhesive or other suitable attachment means. Stated differently, body structure 45 provides a frame for the lift gate.

Figure 10:
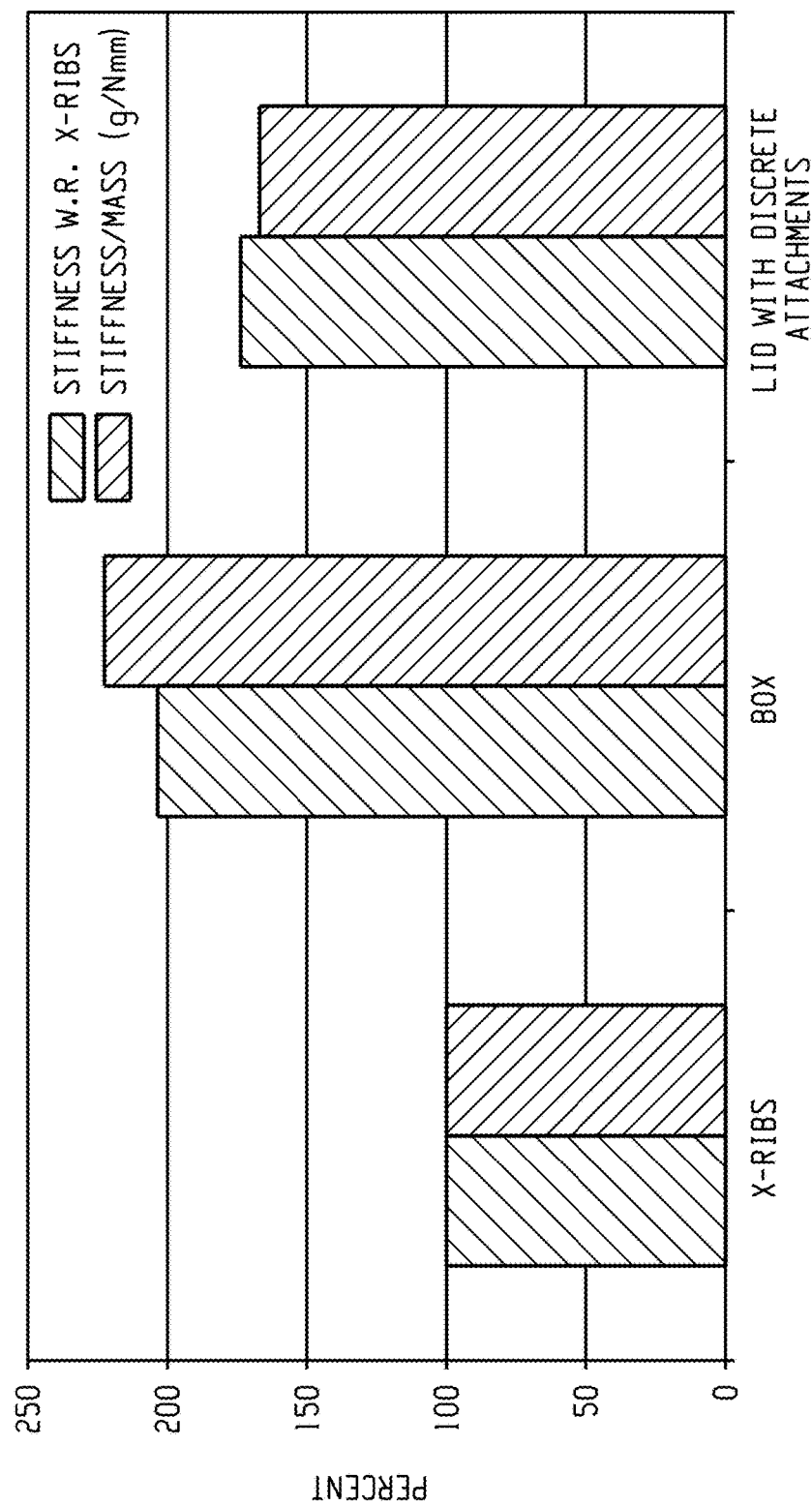
FIG. 10 is a chart illustrating the relative torsion stiffness and stiffness per mass for the profiles of FIG. 9.

FIG. 9 illustrates both a closed hollow profile 70 and a cross ribbed C-profile 72. As shown in FIG. 9, the closed hollow profile takes the shape of a box, while the cross ribbed C-profile is open at the face. The effectiveness of the closed hollow profile was simulated using FEA simulations (Hyperworks 11) and the results are illustrated in FIG. 10. As shown in FIG. 10, applying a lid fixed at some discrete points versus torsion ribs.

Figure 11:
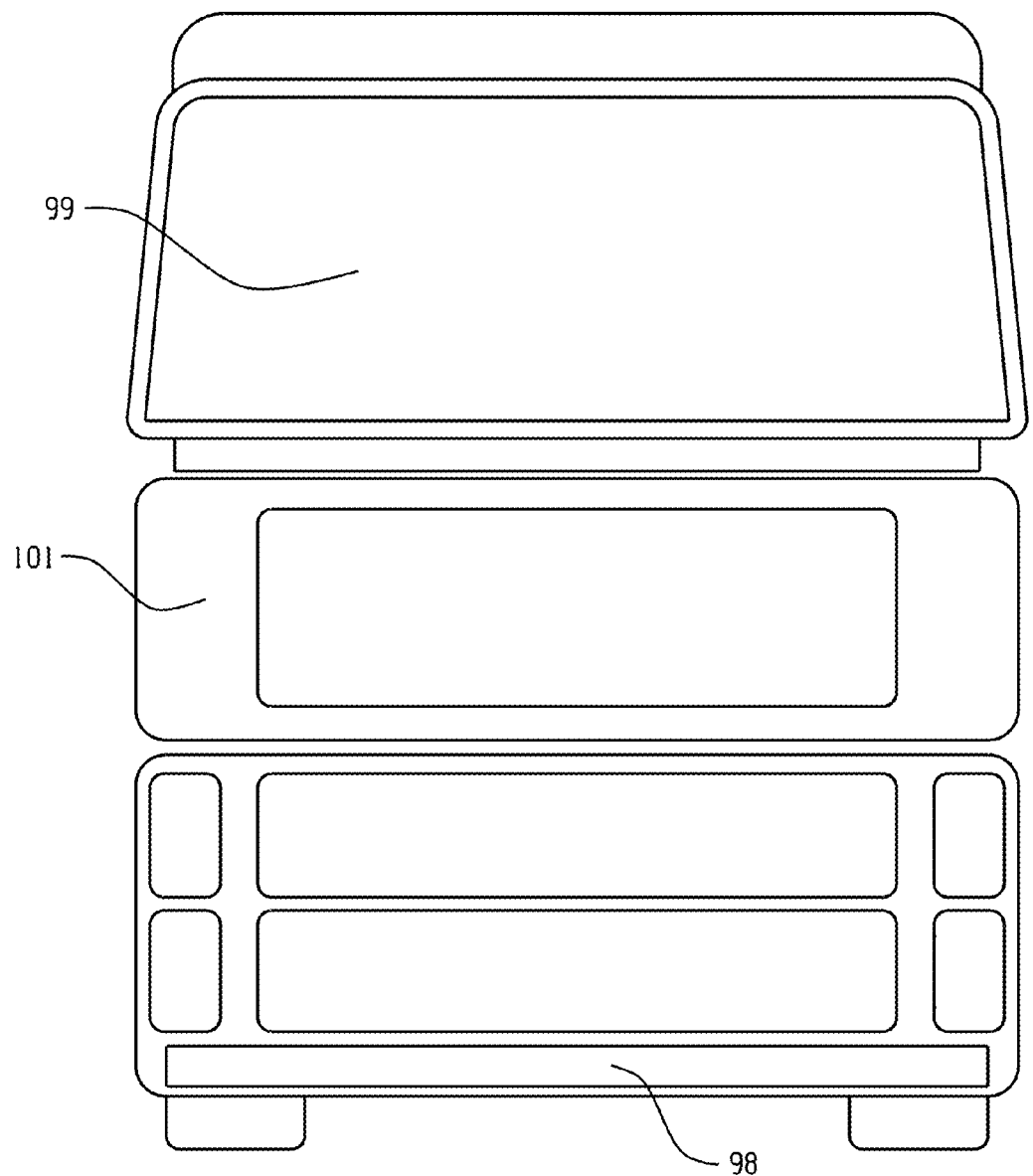
FIG. 11 is a front view of an embodiment of a truck including a front end module.
Figure 12:
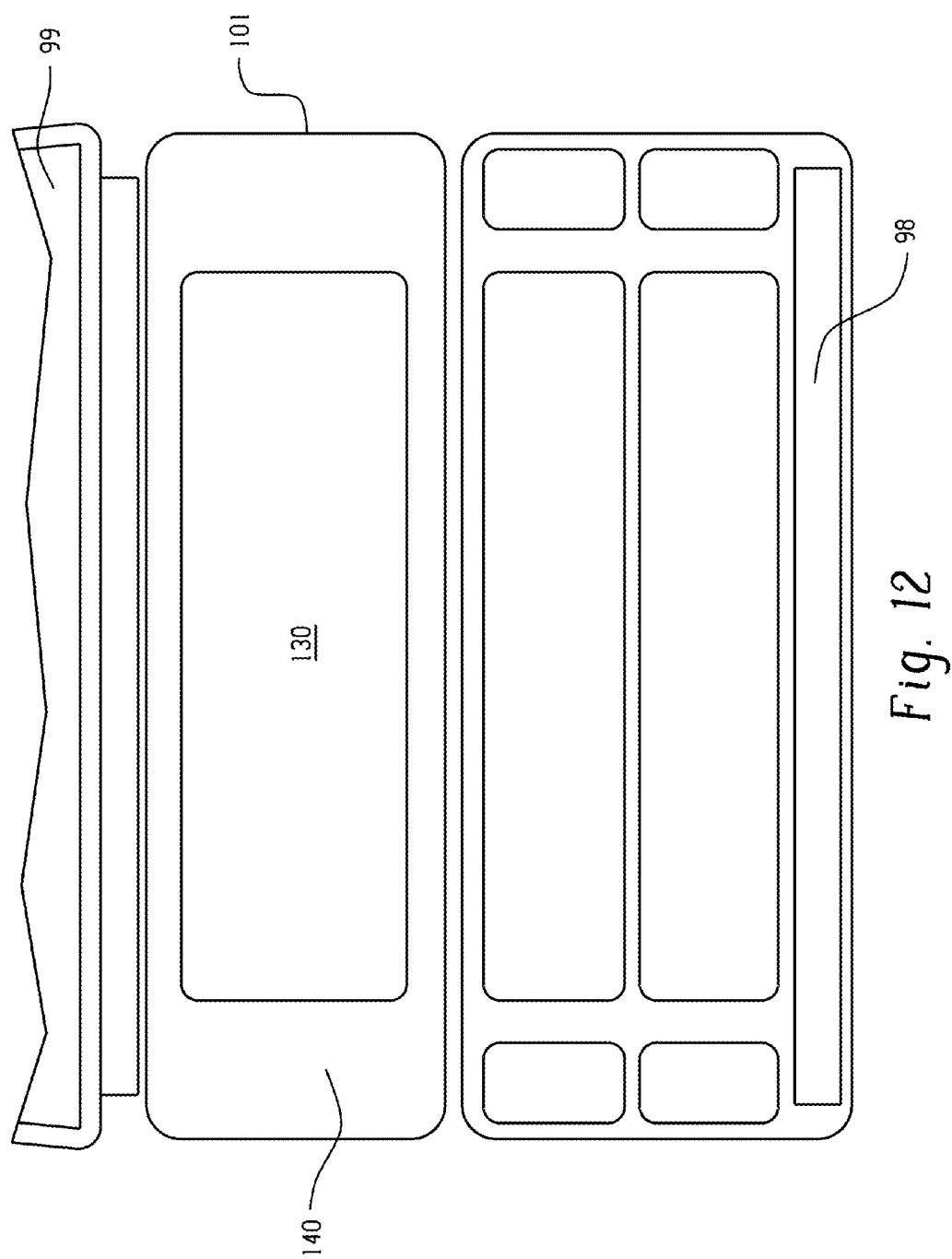
FIG. 12 is a partial front view of an embodiment of a truck including a front end module.

FIGS. 11-12 illustrate a front end of a vehicle (e.g., a truck, bus, train, etc.) including front end module 101. As shown in FIG. 11, front end module 101 is located below windshield 99 and above bumper 98.

Figure 13:
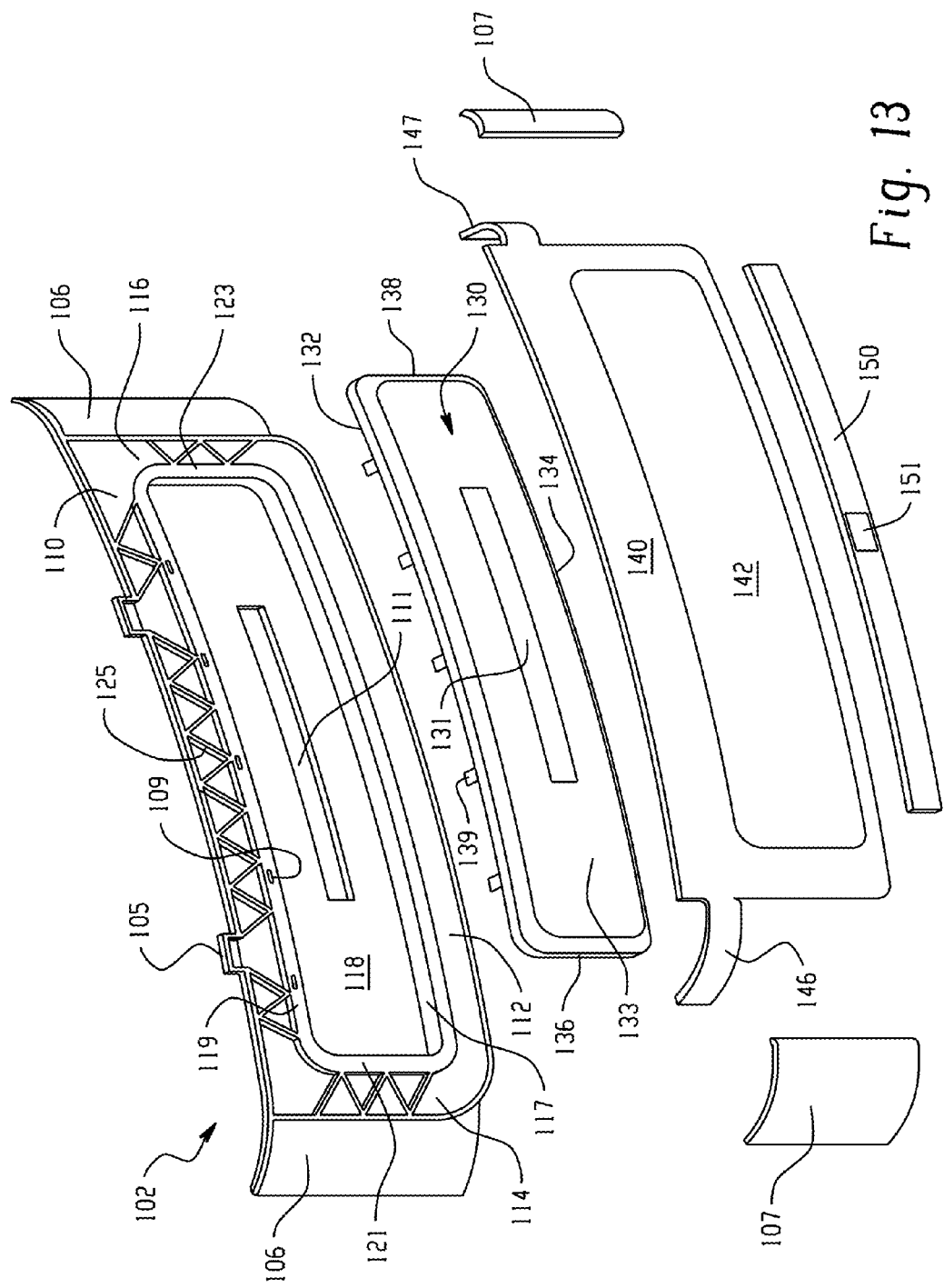
FIG. 13 is an exploded view of an embodiment of a front end module.

FIGS. 13-16 are exploded views of the various components of front end module 101. As shown in FIG. 13, front end module includes carrier 102, insert 130, and cover (also referred to as a mask) 140. Carrier 102 can include top portion 110, bottom portion 112, first side portion 114, and second side portion 116 that define a cavity 118. Cavity 118 can include upper cavity wall 119, first side cavity wall 121, second side cavity wall 123, and lower cavity wall 117. Cavity 118 can be of constant depth (the cavity walls are constant and equal) or of varying depth. The specific depth is dependent upon the desired structural integrity and the space available.

Figure 16:
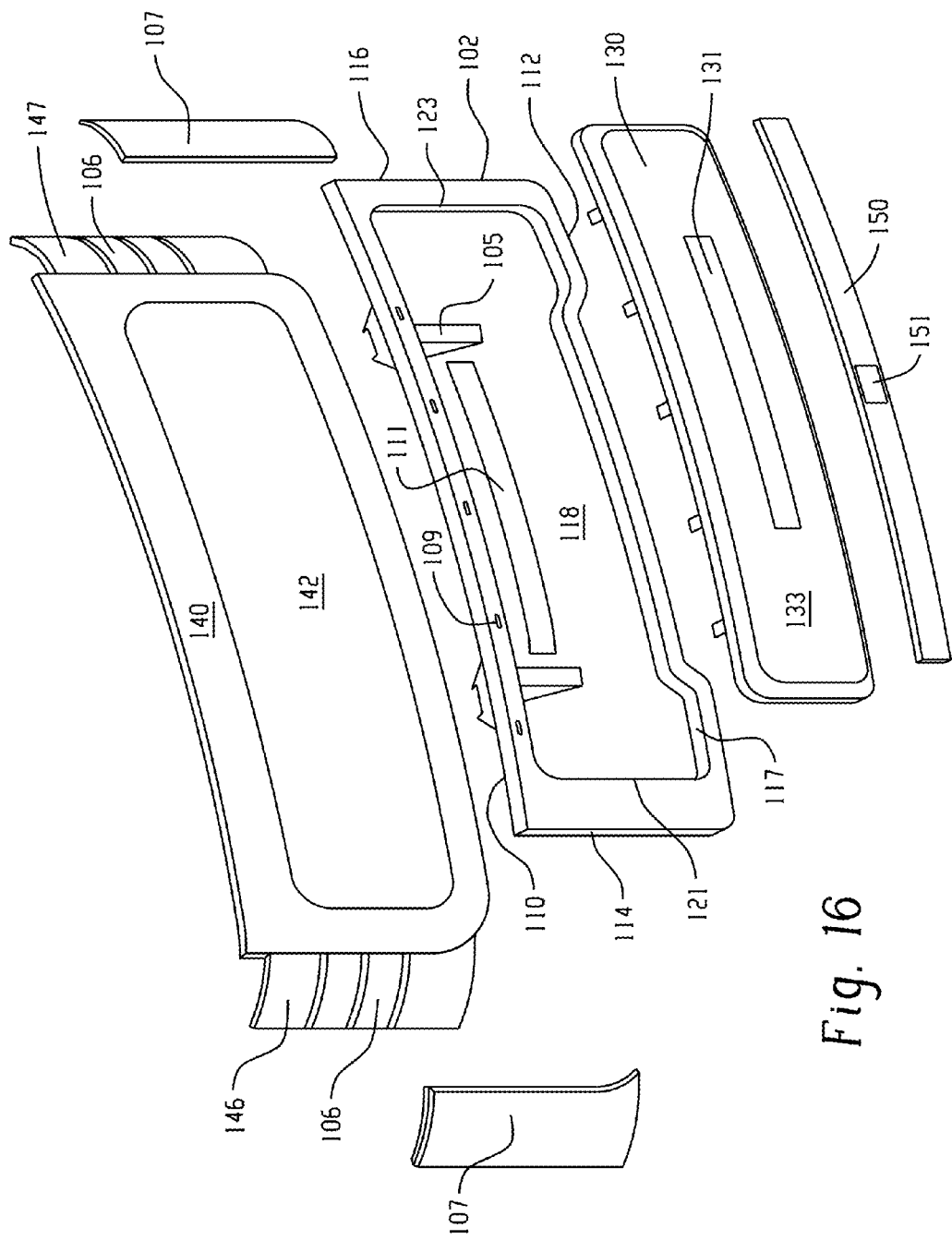
FIG. 16 is an exploded view of another embodiment of a front end module.

Carrier 102 can include an optional opening 111 to allow air to pass through to a cooling system or other internal part of a vehicle. Carrier 102 can be mounted to the chassis (e.g., to the Body-In-White (BIW)) of a vehicle via hinges. For example, hinges 105 can be attached to a rear surface of cavity 118 and upper portion 110, as shown in FIG. 16. In the alternative, hinges 105 can be placed on the rear surface of upper portion 110. In addition, hinges 105 can be positioned on a rear surface of ribs 125 across upper portion 110.

Ribs 125 can be located across at least a portion of top portion 110. For example, ribs 125 can be located across top portion 110 from first side portion 114 to second side portion 116. Ribs 125 can be located across top potion for greater than or equal to 50% of the distance from first side portion 114 to second side portion 116. In addition, ribs 125 can be attached to side portions 114 and 116 and be located at least a portion of the distance from top portion 110 to bottom portion 112. The ribs can be oriented perpendicular to the adjacent cavity wall, or can be oriented at an angle such that the ribs form triangular sections (e.g., that form equilateral triangles between the ribs and the adjacent walls). Desirably, the ribs are located adjacent to the upper cavity wall 119. Optionally, ribs can also be located adjacent to the $1^{st}$ and/or $2^{nd}$ cavity side walls.

Figure 15:
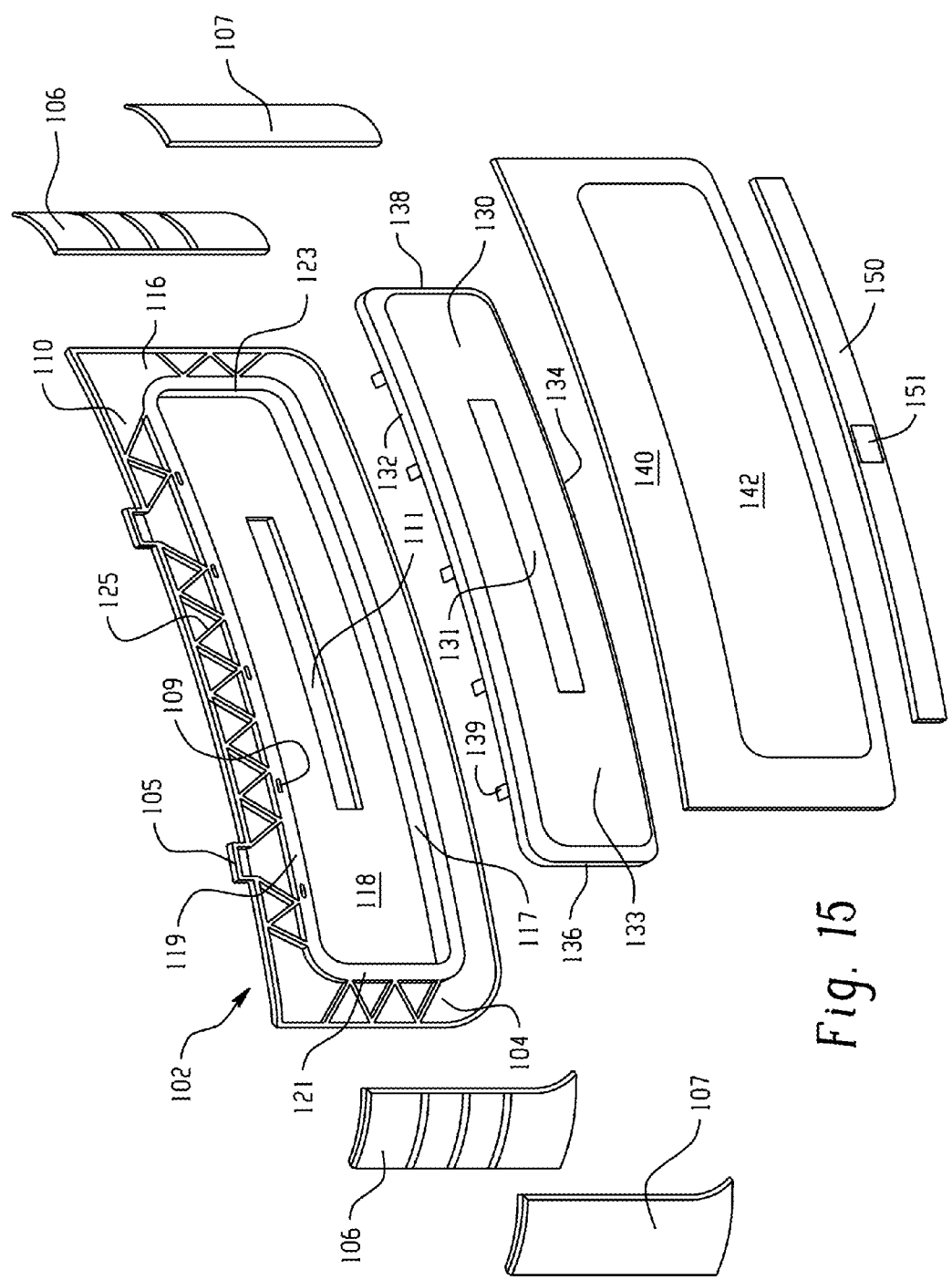
FIG. 15 is an exploded view of another embodiment of a front end module.

Corner wings 106 can be formed integral with carrier 102. As shown in FIG. 13, corner wings 106 are located on the outer portions of carrier 102, outside of first and second side portions 114, 116, and extend from an outer edge of top portion 110 to an outer edge of bottom portion 112. Optionally, as shown in FIG. 15, corner wings 106 can be a separate component, or can be formed integral with the carrier 102. As separate components, corner wings 106 can mounted onto the vehicle (e.g., via a hinge onto the chassis or the Body-In-White (BIW) of a vehicle). Hingedly attaching the corner wings 106 to the vehicle allows the corner wings 106 to be opened (e.g., away from carrier 102), thus allowing greater access to the vehicle and to more space for an operator (e.g., a mechanic or service provider).

Figure 14:
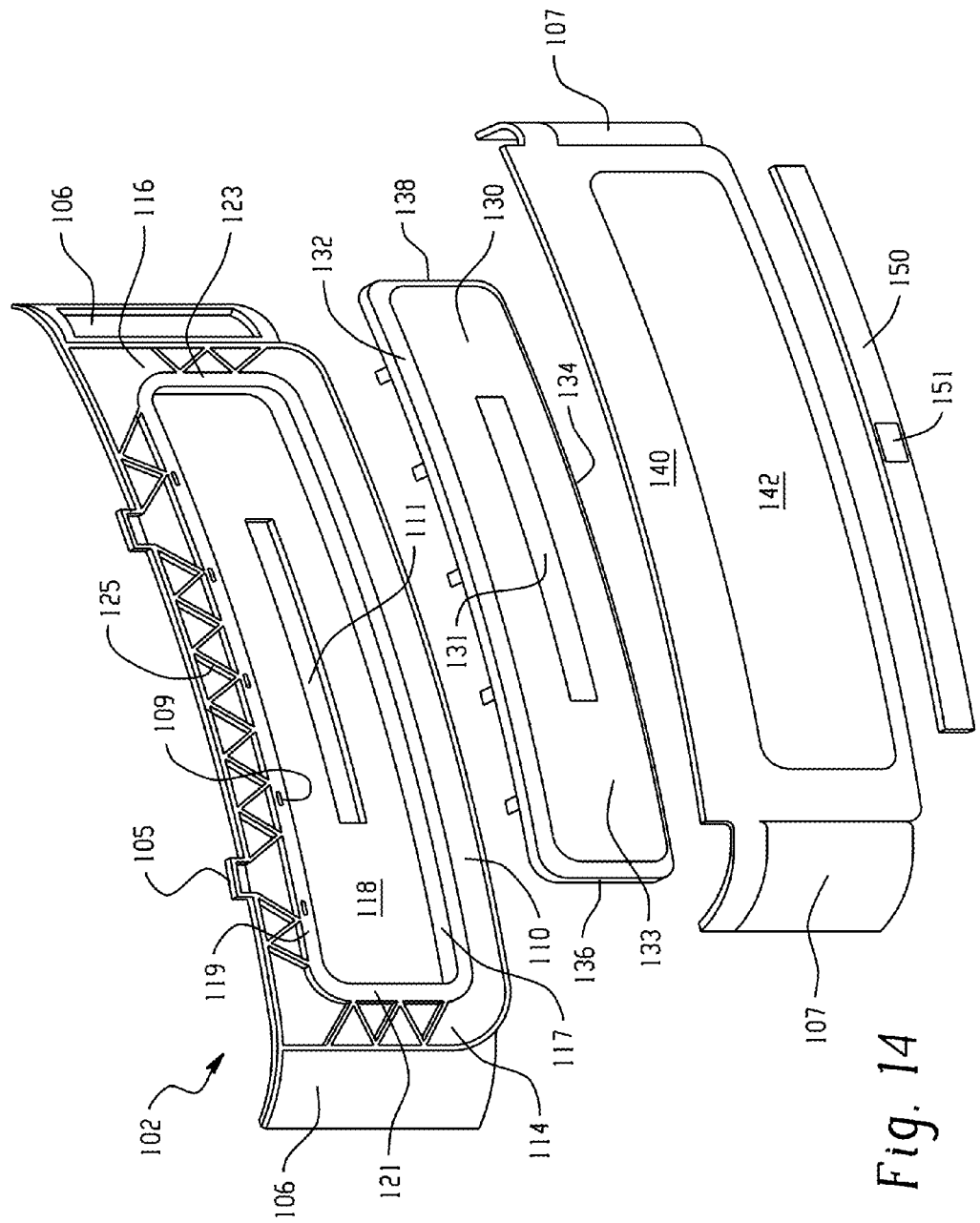
FIG. 14 is an exploded view of an embodiment of a front end module.

A further advantage of the corner wings 106 being formed as a separate component, is that a standard sized carrier 102 can be employed regardless of the size of the vehicle. For example, a single sized carrier 102 can be used on a wide vehicle as well as a narrow vehicle, and different sized wings 106 can be used to ensure full coverage across the face of the two vehicles. Using a single sized carrier 102 can allow for a reduction in tooling and manufacturing costs and promote more efficient production. As shown in FIG. 16, corner wings 106 can be formed integrally with cover 140. Corner wings 106 can be covered by corner fairings 107 which, as shown in FIG. 13, can be completely separate components (e.g., not formed integrally with any other component). In the alternative, as shown in FIG. 14, corner fairings 107 can be formed integrally with cover 140.

Insert 130 can include base 133, which can be planar or slightly curved. Base 133 can include an opening 131 through which air can pass and can be aligned with opening 111 in carrier 102. Insert 130 can include upper wall 132, bottom wall 134, first side wall 136, and second side wall 138. All of the insert walls (e.g. upper wall 132, bottom wall 134, first side wall 136, and second side wall 138) can protrude away from base 133 toward carrier 102. When joined together, insert 130 abuts carrier 102 and forms a closed hollow profile or "box shape." For example, upper wall 132, bottom wall 134, first side wall 136 and second side wall 138 of insert 130 can abut top portion 110, bottom portion 112, first side portion 114, and second side portion 116 of carrier 102 to form a box structure. The box structure can have a depth approximately equal to the depth of cavity walls (117, 119,121, 123) combined with the depth of the insert walls (132, 134, 136, 138) protruding from base 133. The insert walls (132, 134, 136, 138) can fit inside the cavity walls (117, 119,121, 123) such that the depth of the box structure is equal to the depth of the insert walls (132, 134, 136, 138). In addition, insert walls (132, 134, 136, 138) can include protrusions 139 configured to mate with slots 109 to guide the joining of insert 130 and carrier 102 and form the closed hollow profile. Slots 109 can be located within cavity 118.

Insert (130) and carrier (102) can be joined by a removable fastener, a permanent fastener, or a combination thereof. Examples of permanent fasteners include heat staking, or similar permanent fastener. Removable fasteners can include a clip, bolt, snap-fit connection, or similar removable attachment. Using clips and/or other removable elements can simplify tooling and/or enable ease of assembly. For the removable elements it is desirable that they prevent relative motion between the insert and the cavity in-plane of the insert as to get maximum torsion stiffening. Therefore, the openings and the clips can be designed for a snug fit (e.g., where the clip has a size that is only smaller than the opening inner diameter to enable insertion). In other words, the clips can have a size that enables transfer of loads to the insert (e.g., axially, e.g., from the sides of the clip). Slots 109 can be located all around carrier 102 surrounding cavity 118.

Cover 140 can be located over carrier 102 and insert 130. As shown in FIG. 13, cover 140 can include first wing portion 146 and second wing portion 147 configured to cover at least a portion of corner wings 106. In addition, cover 140 can include corner fairings 107 integrally formed with cover 140, as shown in FIG. 14. Cover 140 can include opening 142 configured to allow at least a portion of insert 130 to be visible. As shown in FIG. 16, cover 140 can include corner wings 106. Cover 140 can be mounted directly to the Body-In-White (BIW) of a vehicle and include first side flange 144 and second side flange 145 for attachment with carrier 102, as illustrated in FIG. 16.

A handle cover portion 150 can be included below cover 140. For example, as shown in FIG. 16, handle portion 150 can include a handle opening 151 to access a handle or other mechanism for opening front end module.

Examples of polymeric materials include thermoplastic materials as well as combinations of thermoplastic materials with elastomeric materials and/or thermoset materials. Possible thermoplastic materials include polybutylene terephthalate (PBT); acrylonitrile-butadiene-styrene (ABS); polycarbonate (LEXAN™ and LEXAN™ EXL resins, commercially available from SABIC Innovative Plastics); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC Innovative Plastics); blends of polycarbonate/polyethylene terephthalate (PET)/PBT; polybutylene terephthalate and impact modifier (XENOY™ resins, commercially available from SABIC Innovative Plastics); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites; long fiber reinforced thermoplastics (VERTON™ resins, commercially available from SABIC Innovative Plastics) and thermoplastic olefins (TPO), as well as combinations comprising at least one of the foregoing.

Generally, the fibers used for this application are long fibers, e.g., fibers having an aspect ratio (length/diameter) of greater than or equal to 10, specifically, greater than or equal to 50, more specifically, 50 to 500, and yet more specifically, 80 to 400. For example, the diameter of the long fiber may range from 5 to 35 micrometers (μm), specifically, 10 to 20 μm. The fibers can have a length, for example, of greater than or equal to 0.4 millimeter (mm), specifically, greater than or equal to 1 mm, more specifically, a length of greater than or equal to 2 mm.

An exemplary filled resin is STAMAX™ resin, which is a long glass fiber filled polypropylene resin also commercially available from SABIC Innovative Plastics. Some possible reinforcing materials include fibers, such as glass, carbon, and so forth, as well as combinations comprising at least one of the foregoing; e.g., long glass fibers and/or long carbon fiber reinforced resins. The vehicle component can also be formed from combinations comprising at least one of any of the above-described materials.

In the present lift gate design, adding an insert (e.g., a relatively flexible lid) structure on a cavity (e.g., on an open, box-like shape), fixed at a number of points either removably (e.g., by clips), or by permanent fixations (e.g., heat stack, glue, etc.) attains greater stiffness overweight compared to classical molded solutions (e.g., ribbing). Herein the fixations can be separate and discrete (e.g., the insert is not attached all the way around).

The present design can combine a closed section geometry forming a hollow shape (e.g., in the bottom portion), e.g., to enhance bending and/or torsion stiffness, with ribbing (in the upper portion). In other words, around the window and/or above the lights there can be ribbing, while below the window and lights the lift gate can be free of ribbing. Below the window and lights can be a structural compartment formed by an insert and cavity, with an aesthetic over disposed over the structural compartment.

Set forth below are examples of the lift gate described herein, and vehicles comprising the same. It is noted that the lift gate is only one example of a vehicle component that can comprise the closed section geometry which forms a hollow shape that provides bending and torsion stiffness in polymeric vehicle components.

Embodiment 1: A vehicle component (1) for a vehicle comprising: a top portion (10), a bottom portion (12), a first side portion (14), and a second side portion (16); wherein the bottom portion (12) defines a cavity (18); wherein the cavity (18) comprises a bottom cavity wall (17), cavity side walls (21, 23), and a top portion of the cavity (18) having an upper cavity wall (19); an insert (24) located within the cavity (18) and attached to the upper cavity wall (19) the bottom cavity wall (17), and/or the cavity side walls (21, 23); and an insert cover attached over the insert, on a side of the insert opposite the cavity.

Embodiment 2: The vehicle component of Embodiment 1, wherein the insert is attached to the cavity with a first attachment mechanism (26), wherein the first attachment mechanism is removably attached.

Embodiment 3: The vehicle component of Embodiment 2, wherein the first attachment mechanism (26) comprises a clip, bolt, screw, snap fit connection, or combination comprising at least one of the foregoing.

Embodiment 4: The vehicle component of any of Embodiments 2-3 wherein the upper cavity wall (19) comprises an opening through the upper cavity wall (19) configured to receive the first attachment mechanism.

Embodiment 5: The vehicle component of any of Embodiments 1-4, wherein the insert is attached to the cavity with a second attachment mechanism (28), wherein the second attachment mechanism (28) is a permanent attachment.

Embodiment 6: The vehicle component of Embodiment 4, wherein the second attachment mechanism (28) comprises heat stake.

Embodiment 7: The vehicle component of any of Embodiments 1-5, wherein cavity (18) extends from the first side portion (14) to the second side portion (16).

Embodiment 8: The vehicle component of any of Embodiments 1-6, wherein the insert is a polymeric material.

Embodiment 9: The vehicle component of Embodiment 7, wherein the polymeric material comprises of long glass fiber filled polypropylene.

Embodiment 10: The vehicle component of any of Embodiments 1-8, wherein at least one of the first side portion (14), the second side portion (16), and the top portion (10) comprises ribs (25).

Embodiment 11: The vehicle component of any of Embodiments 1-9, wherein the insert (24) comprises a channel (29) sized to accommodate a cable.

Embodiment 12: The vehicle component of any of Embodiments 1-11, further comprising a window opening (30) located below the top portion (10) and above cavity (18).

Embodiment 13: The vehicle component of any of Embodiments 1-12, wherein at least one of the top portion (10), the bottom portion (12), the first side portion (14), and the second side portion (16) comprises an opening (60).

Embodiment 14: The vehicle component of Embodiment 13, wherein the vehicle component is formed from a molding process that uses media, and wherein the media can enter the opening (60), and wherein the media comprises at least one of fluids and cores and sliders.

Embodiment 15: The vehicle component of any of Embodiments 1-14, wherein the cavity 18 occupies less than all of the lower portion.

Embodiment 16: The vehicle component of any of Embodiments 1-15, wherein the cavity is located over 60% to 90% of the lower portion.

Embodiment 17: The vehicle component of any of Embodiments 1-16, wherein at least one of the cavity walls (17, 19, 21, 23) is spaced apart from a periphery of the lower portion.

Embodiment 18: The vehicle component of any of Embodiments 1-17, wherein the cavity is free of ribbing.

Embodiment 19: The vehicle component of any of Embodiments 1-18, wherein below a window opening and below light openings, the vehicle component is free of ribbing.

Embodiment 20: The vehicle component of Embodiment 19, wherein the vehicle component has ribbing above the window opening and to the sides of the window opening.

Embodiment 21: The vehicle component of any of Embodiments 1-20, wherein the top portion (10), the bottom portion (12), the first side portion (14), the second side portion (16); the insert (24); and the insert cover are each formed from a material, and wherein the material is a polymeric material.

Embodiment 22: The vehicle component of any of Embodiments 1-21, wherein the top portion (10), the bottom portion (12), the first side portion (14), the second side portion (16); the insert (24); and the insert cover are each formed from a material, and wherein the material consists of a polymeric material.

Embodiment 23: The vehicle component of any of Embodiments 1-22, wherein each of the top portion (10), the bottom portion (12), the first side portion (14), the second side portion (16); the insert (24); and the insert cover are formed either the same or a different polymeric material.

Embodiment 24: The vehicle component of any of Embodiments 1-23, wherein the top portion (10), the bottom portion (12), the first side portion (14), the second side portion (16); the insert (24); and the insert cover are each formed from a material, and wherein the material is free of metal (i.e., comprises no added metal; any metal is mere impurities in the material).

Embodiment 25: The vehicle component of any of Embodiments 1-24, wherein the cavity has a depth of greater than or equal to 10 millimeters.

Embodiment 26: The vehicle component of Embodiment 25, wherein the depth is constant.

Embodiment 27: The vehicle component of Embodiment 25, wherein the depth is varied.

Embodiment 28: The vehicle component of any of Embodiments 1-27, further comprising ribs are located adjacent to the upper cavity wall.

Embodiment 29: The vehicle component of Embodiment 28, wherein the ribs are oriented at an angle so as to form a triangle with the upper cavity wall.

The vehicle component of any of Embodiments 28-24, wherein the vehicle component is a lift gate.

Embodiment 26: The vehicle component of any of Embodiments 28-25, wherein the insert is attached to the lower portion at separate and discrete fixations.

Embodiment 27: The vehicle component of any of Embodiments 28-26, wherein the lower portion, the upper portion, and the insert are formed from polymeric materials.

Embodiment 28: The vehicle component of any of Embodiments 21-27, wherein the only metal in the lift gate is wiring, part of the lights, part of the lock mechanism, or attachment of the lift gate to the vehicle.

Embodiment 29: A vehicle component (1, 101) for a vehicle comprising: a carrier (102) comprising a top portion (10, 110), a bottom portion (12, 112), a first side portion (14, 114), and a second side portion (16, 116); a cavity (18, 118); wherein the cavity (18, 118) comprises a bottom cavity wall (17, 117), cavity side walls (21, 23, 121, 123), and a top portion of the cavity (18, 118) having an upper cavity wall (19, 119); an insert (24, 130) covering at least a portion of the cavity (18, 118) and attached to the upper cavity wall (19, 119) the bottom cavity wall (17, 117), and/or the cavity side walls (21, 23, 121, 123); and a cover (44, 140) attached to the carrier.

Embodiment 30: The vehicle component of Embodiment 29, wherein the vehicle component is a lift gate.

Embodiment 31: The vehicle component of Embodiment 29, wherein the vehicle component is a front end module.

Embodiment 32: The vehicle component of any of Embodiments 29-31, wherein the insert is attached to the cavity with a first attachment mechanism (26), wherein the insert is removably attached.

Embodiment 33: The vehicle component of Embodiment 32, wherein the first attachment mechanism (26) comprises a clip, bolt, screw, snap fit connection, or combination comprising at least one of the foregoing.

Embodiment 34: The vehicle component of any of Embodiments 32-33, wherein the upper cavity wall (19, 119) comprises an opening through the upper cavity wall (19, 119) configured to receive the first attachment mechanism.

Embodiment 35: The vehicle component of any of Embodiments 29-34, wherein the insert is attached to the cavity with a second attachment mechanism (28), wherein the second attachment mechanism (28) is a permanent attachment.

Embodiment 36: The vehicle component of Embodiment 35, wherein the second attachment mechanism (28) comprises heat stake.

Embodiment 37: The vehicle component of any of Embodiments 29-36, wherein cavity (18) extends from the first side portion (14) to the second side portion (16).

Embodiment 38: The vehicle component of any of Embodiments 29-37, wherein the insert is a polymeric material.

Embodiment 39: The vehicle component of Embodiment 38, wherein the polymeric material comprises of long glass fiber filled polypropylene.

Embodiment 40: The vehicle component of any of Embodiments 29-39, wherein at least one of the first side portion (14), the second side portion (16), and the top portion (10) comprises ribs (25).

Embodiment 41: The vehicle component of any of Embodiments 29-40, wherein the insert (24) comprises a channel (29) sized to accommodate a cable.

Embodiment 42: The vehicle component of any of Embodiment 29-41, further comprising a window opening (30) located below the top portion (10) and above cavity (18).

Embodiment 43: The vehicle component of any of Embodiments 29-42, wherein at least one of the top portion (10), the bottom portion (12), the first side portion (14), and the second side portion (16) comprises an opening (60).

Embodiment 44: The vehicle component of Embodiment 43, wherein the vehicle component is formed from a molding process that uses media, and wherein the media can enter the opening (60), and wherein the media comprises at least one of fluids and cores and sliders.

Embodiment 45: The vehicle component of any of Embodiments 29-44, wherein the cavity (18) occupies less than all of the bottom portion (12, 112).

Embodiment 46: The vehicle component of any of Embodiments 29-45, wherein the cavity is located over 60% to 90% of the distance from the first side portion (14, 114) to the second side portion (16, 116).

Embodiment 47: The vehicle component of any of Embodiments 29-46, wherein the cavity is free of ribbing.

Embodiment 48: The vehicle component of any of Embodiments 29-47, wherein below a window opening and below light openings, the lift gate is free of ribbing.

Embodiment 49: The vehicle component of any of Embodiments 29-48, wherein the lift gate has ribbing above the window opening and to the sides of the window opening.

Embodiment 50: The vehicle component of any of Embodiments 29-49, further comprising corner wings (106) extending laterally from first side portion (114) and second side portion (116) and corner fairings (107) configured to cover at least a portion of corner wings (106).

Embodiment 51: The vehicle component of any of Embodiments 29-50, wherein cover (140) comprises an opening (144) and at least a portion of insert (130) is visible through opening (144).

Embodiment 52: The vehicle component of any of Embodiments 29-51, wherein the corner wings (106) are integrally formed with first side portion (114) and second side portion (116).

Embodiment 53: The vehicle component of any of Embodiments 29-52, wherein the corner wings (106) are separate from first side portion (114) and second side portion (116).

Embodiment 54: The vehicle component of any of Embodiments 29-53, wherein the corner fairings (107) are not formed as a part of another component.

Embodiment 55: The vehicle component of any of Embodiments 29-54, wherein the corner wings comprise hinges.

Embodiment 56: The vehicle component of any of Embodiments 29-55, wherein cover (140) comprises first wing portion (146) and second wing portion (147) configured to cover at least a portion of corner wings (106).

Embodiment 57: The vehicle component of any of Embodiments 29-56, further comprising a handle portion (150) below mask (140) and extending the length of raised portion (113) and comprising a handle (151).

Embodiment 58: The vehicle component of any of Embodiments 29-57, wherein the cover (140) further comprises first side flange (144) and second side flange (145) configured to receive first side portion (114), and second side portion (116).

Embodiment 59: The vehicle component of any of Embodiments 29-58, wherein the corner fairings (107) are integral with cover (140).

Embodiment 60: The vehicle component of any of Embodiments 29-59, wherein the vehicle component further comprises hinges (105).

Embodiment 61: The vehicle component of any of Embodiments 29-60, wherein the top portion (10), the bottom portion (12), the first side portion (14), the second side portion (16), the insert (24), and the insert cover, are each formed from a polymeric material, and preferably from long glass fiber filled polypropylene.

Embodiment 62: The vehicle component of any of Embodiments 29-61, wherein the top portion (10), the bottom portion (12), the first side portion (14), the second side portion (16); the insert (24); and the insert cover are each formed from a material, and wherein the material consists of a polymeric material.

Embodiment 63: The vehicle component of any of Embodiments 29-62, wherein each of the top portion (10), the bottom portion (12), the first side portion (14), the second side portion (16); the insert (24); and the insert cover are formed either the same or a different polymeric material.

Embodiment 64: The vehicle component of any of Embodiments 29-63, wherein the top portion (10), the bottom portion (12), the first side portion (14), the second side portion (16); the insert (24); and the insert cover are each formed from a material, and wherein the material is free of metal.

Embodiment 65: The vehicle component of any of Embodiments 29-64, wherein the cavity has a depth of greater than or equal to 10 millimeters.

Embodiment 66: The vehicle component of Embodiment 65, wherein the depth is constant.

Embodiment 67: The vehicle component of Embodiment 65, wherein the depth is varied.

Embodiment 68: The vehicle component of any of Embodiments 29-67, further comprising ribs are located adjacent to the upper cavity wall.

Embodiment 69: The vehicle component of Embodiment 68, wherein the Ribs are oriented at an angle so as to form a triangle with the upper cavity wall.

Embodiment 70: A method for making vehicle component of any of Embodiments 1-69, comprising: forming the component via molding; wherein the molding uses, and wherein the media comprises at least one of fluids and cores and sliders.

Embodiment 71: A vehicle comprising: a structural body and the vehicle component of any of Embodiments 1-69.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. U.S. Provisional Application Nos. 61/935,718 and 61/887,687 are hereby incorporated herein by reference in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A vehicle component for a vehicle comprising:
   a carrier comprising a top portion, a bottom portion, a first side portion, and a second side portion;
   a cavity, wherein the cavity comprises a bottom cavity wall, cavity side walls, and a top portion of the cavity having an upper cavity wall;
   an insert covering at least a portion of the cavity and attached to the upper cavity wall the bottom cavity wall, and/or the cavity side walls;
   a cover attached to the carrier, and
   corner wings extending laterally from the first side portion and the second side portion and corner fairings configured to cover at least a portion of the corner wings, and wherein the corner wings comprise hinges.

2. The vehicle component of claim 1, wherein the insert is attached to the cavity with a first attachment mechanism, wherein the insert is removably attached.

3. A vehicle component for a vehicle comprising:
   a carrier comprising a top portion, a bottom portion, a first side portion, and a second side portion;
   a cavity, wherein the cavity comprises a bottom cavity wall, cavity side walls, and a top portion of the cavity having an upper cavity wall;
   an insert covering at least a portion of the cavity and attached to the upper cavity wall the bottom cavity wall, and/or the cavity side walls; and
   a cover attached to the carrier;
   wherein the insert is attached to the cavity with a second attachment mechanism, wherein the second attachment mechanism is a permanent attachment, and wherein the second attachment mechanism comprises a heat stake.

4. The vehicle component of claim 1, wherein the insert is a polymeric material and wherein the polymeric material comprises long glass fiber filled polypropylene.

5. The vehicle component of claim 1, wherein at least one of the first side portion, the second side portion, and the top portion comprises ribs.

6. The vehicle component of claim 1, further comprising a window opening located below the top portion and above the cavity, wherein the cavity is located over 60% to 90% of the distance from the first side portion to the second side portion.

7. The vehicle component of claim 1, wherein the cavity is free of ribbing.

8. The vehicle component of claim 1, wherein below a window opening and below light openings, the vehicle component is free of ribbing.

9. The vehicle component of claim 8, wherein the vehicle component has ribbing above the window opening and to the sides of the window opening.

10. The vehicle component of claim 1, wherein the corner fairings are not formed as a part of another component.

11. The vehicle component of claim 1, wherein the cover comprises a first wing portion and a second wing portion configured to cover at least a portion of corner wings.

12. The vehicle component of claim 1, wherein the cover further comprises a first side flange and a second side flange configured to receive the first side portion, and the second side portion.

13. A vehicle component for a vehicle comprising:
   a carrier comprising a top portion, a bottom portion, a first side portion, and a second side portion;
   a cavity, wherein the cavity comprises a bottom cavity wall, cavity side walls, and a top portion of the cavity having an upper cavity wall;
   an insert covering at least a portion of the cavity and attached to the upper cavity wall the bottom cavity wall, and/or the cavity side walls; and
   a cover attached to the carrier, wherein the top portion, the bottom portion, the first side portion, the second side portion, the insert, and the cover are each formed from a polymeric material and wherein the polymeric material comprises long glass fiber filled polypropylene, and wherein the polymeric material is free of metal.

14. The vehicle component of claim 1, wherein the cavity has a depth of greater than or equal to 10 millimeters.

15. A vehicle comprising: a structural body and the vehicle component of claim 1.

16. A method for making the vehicle component of claim 1 comprising: forming the vehicle component via a molding process, wherein the molding process uses media, and wherein the media comprises at least one of fluids and cores and sliders.

17. The vehicle component of claim 1, wherein the walls of the cavity form a cavity depth; and wherein the insert comprises a base, an upper wall, a bottom wall, first and second side walls, wherein the upper wall, the bottom wall, the first side wall and second side walls protrude away from the base such that the upper wall, the bottom wall and the first and second side walls define an insert depth protruding from the base, and wherein the insert abuts the carrier forming a closed hollow profile.

18. The vehicle component of claim 17, wherein the upper wall, bottom wall, and first and second side walls fit inside the cavity walls such that a depth of a box structure is equal to the depth of the upper wall, bottom wall, and first and second side walls.

19. The vehicle component of claim 17, further comprising protrusions positioned on the upper wall, bottom wall, and first and second side walls and the cavity further comprises slots such that the protrusions are configured to mate with the slots to join the insert and the carrier.

* * * * *